3,349,009
SEPARATION OF HYDROCARBONS BY DISTILLING WITH A FLUOROCARBON
Forrest N. Ruehlen, Bartlesville, Okla., assignor to Phillips Petroleum Company, a corporation of Delaware
Filed Nov. 2, 1965, Ser. No. 506,086
9 Claims. (Cl. 203—67)

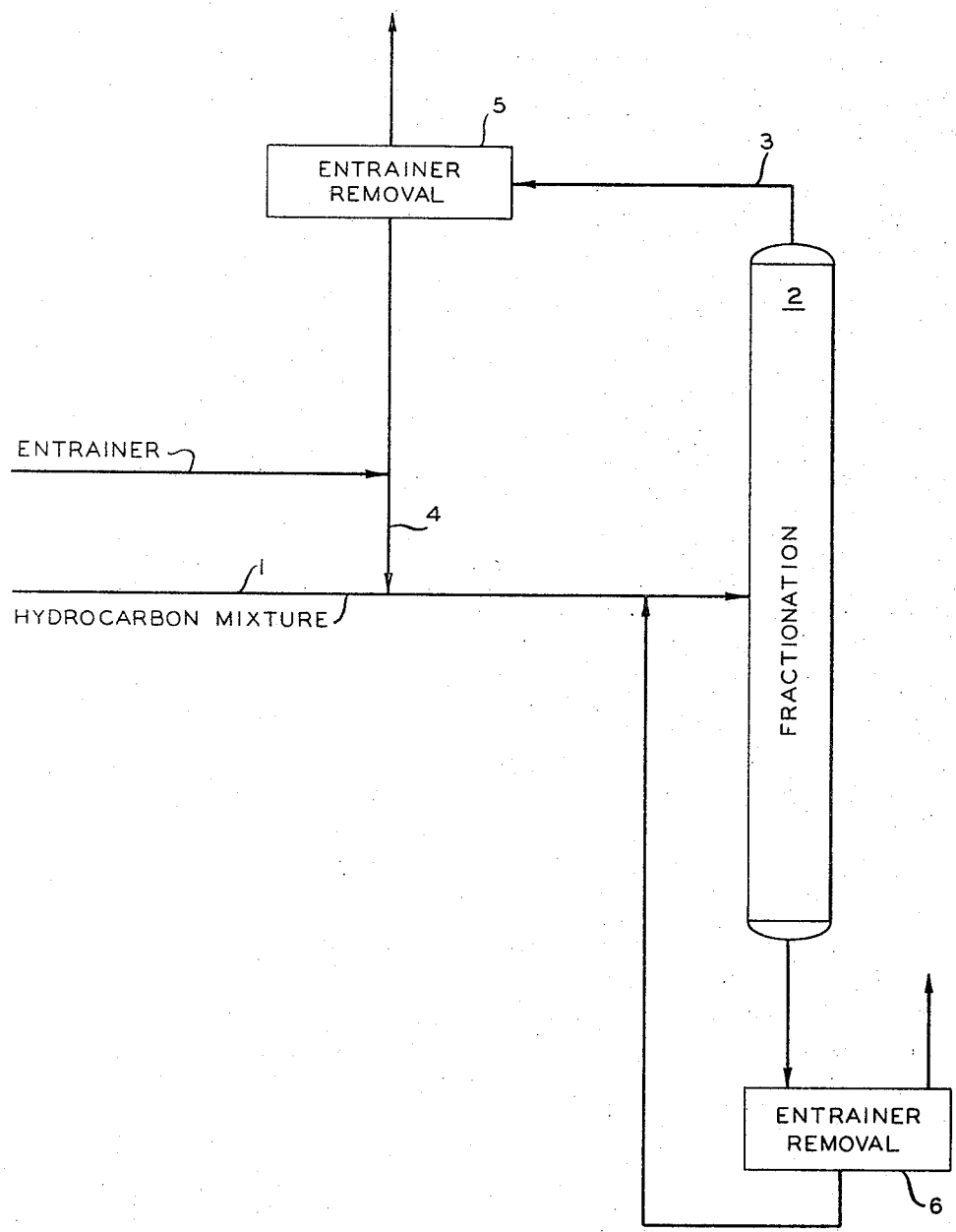

This invention relates to the separation of hydrocarbons.

In one of its aspects, this invention relates to the separation of close-boiling hydrocarbons by the method including adding an entrainer to the mixture of close-boiling hydrocarbons followed by distillation of the mixture. In another aspect, this invention relates to the separation of a mixture of close-boiling hydrocarbons by adding an entrainer to the mixture, whereby an azeotrope of one of the hydrocarbons in the mixture and the entrainer is formed, and then distilling the mixture to separate a component therefrom. In still another aspect, this invention relates to a method of separating a narrow boiling range mixture of hydrocarbons including the step of subjecting a feedstock comprising a narrow boiling range mixture of hydrocarbons to distillation in the presence of an entrainer. In still another aspect, this invention relates to the separation of close-boiling hydrocarbons using a fluorohalocarbon entrainer having 2 to 6 carbon atoms.

Large quantities of hydrocarbon mixtures are obtained in modern industrial processes such as, for example, the cracking of petroleum products. The most common and frequently used method for separating mixtures of hydrocarbons into individual constituents is fractional distillation. However, when a mixture has two or more hydrocarbons which have a boiling point of less than one or two degrees apart, difficulty is encountered in separating by distillation. In some cases, it is very difficult to separate these close-boiling hydrocarbons by conventional distillation means. For example, it has been found that n-pentane which boils at 36.2° C. cannot be readily separated from 2-pentene (mixed cis and trans) which boils at 36.7° C. by conventional fractional distillation.

The separation of volatile compounds by azeotropic distillation is well known and is practiced to effect separations which are difficult or even impossible by ordinary distillation methods. The mixtures of volatile compounds in many instances have such volatility characteristics that ordinary distillation yields only one component of acceptable purity, and in some instances substantially no separation at all is effected. This difficulty in effecting separation by fractional distillation may be due to the formation of constant boiling mixtures or azeotropes, or it may be that the boiling points of the components are so close together that columns of a practical number of plates are ineffective. In order to separate such mixtures, solvent extraction or azeotropic distillation processes may be used. In the process of azeotropic distillation, an additional volatile component is added which so alters the volatilities of the original constituents that satisfactory separation in a fractionating column of practical number of plates becomes possible. In order for azeotropic distillation to be useful, separation and recovery of the entrainer from the products must be possible. Most azeotropes, as is well known, are of the low boiling or minimum boiling point type, although some high boiling or maximum boiling point ones are known. In this type of distillation, the entrainer is added to the system and it preferentially azeotropes with one or more of the components, during the distillation. The azeotrope of the entrainer with one or more components of the mixture which are desired to be separated has a greater volatility than the remaining component or components and/or azeotropes thereof. Upon separation of the entrainer from the azeotropic mixture by any of various means, the separation of the original mixture has been effected. In case any entrainer remains in solution in the still bottoms, it may be separated therefrom to complete the separation and recovery process. Normally, however, the amount of entrainer employed is adjusted so that substantially all is taken overhead and the kettle product is substantially entrainer-free.

It has now been found that the difficultly separable mixtures, such as the foregoing described mixtures, can be separated in the presence of an entrainer to change the relative volatility of one of the components of the mixture and thereby improve the purity of at least one of the components in the mixture being separated.

By various aspects of this invention, one or more of the following or other objects can be obtained.

It is an object of this invention to provide a process for the separation of close-boiling hydrocarbons. Another object of this invention is to provide an improved process for separating a constituent of improved purity from a mixture of close-boiling hydrocarbons. Still another object is to separate a mixture of close-boiling hydrocarbons in an economical and convenient method.

Other aspects, objects, and the several advantages of this invention will be apparent from a study of this disclosure, drawing, and the appended claims.

In accordance with the practice of this invention, there is provided a method for separating a mixture of close-boiling hydrocarbons comprising subjecting the mixture to distillation conditions in the presence of an entrainer comprising fluorohalocarbons having 2 to 6 carbon atoms.

There is further provided, in accordance with this invention, a method of separating a mixture of close-boiling hydrocarbons into one or more components including adding a fluorohalocarbon having 2 to 6 carbon atoms per molecule to the hydrocarbon mixture to form an admixture, said fluorohalocarbon functioning as an entrainer, and distilling the admixture thus formed whereby a higher purity product of at least one of the components of the mixture is obtained.

The applicable fluorohalocarbons are those compounds having 2 to 6 carbon atoms which also contain at least 1 fluorine atom and at least 1 halogen atom other than fluorine. The non-fluorine halogen can be chlorine, bromine, or iodine, but the chlorofluoro analogs are most commonly available and, therefore, preferred. Some examples of suitable entrainers are: 1,2-difluoro-1,2-dichloroethane; 1,1,2-trifluoro-1,2-dichloroethane; 1,1-difluoro-1,2-dichloroethane; tetrafluoro-1,2-dichloroethane; 1-chloro-2-fluoroethane; 1,3-dibromo-1,1,2,2-tetrafluoropropane; 1,1,1,2,3-pentafluoro-4-iodobutane; 1,1,1-trichloro-2,2-dimethyl-3,4,4,4-tetrafluorobutane, and 1-fluoro-1,2-dichloroethane.

The above-described fluorohalocarbons can be used as entrainers for the azeotropic separation of hydrocarbon mixtures which include aromatic, aliphatic, and cyclic materials, including both saturated and unsaturated compounds. By subjecting two or more materials of the above general types to an azeotropic distillation using a suitable fluorohalocarbon, the mixture can be separated into fractions enriched in at least one of the components of the mixture. To be effective in the azeotropic distillation of a specific hydrocarbon mixture, an entrainer should be chosen which has a boiling point within about 40–50° C. of that of the hydrocarbon mixture. It is generally preferred that the entrainer have a boiling point lower than that of the hydrocarbon mixture.

In practice, the fluorohalocarbons form a binary azeotrope with at least one of the components of the mixture and this azeotrope has a boiling point which is lower than other members of the hydrocarbon mixture. In the course of distillation, therefore, the entraining agent and one member of the hydrocarbon mixture are carried overhead in a relatively low boiling azeotrope. Enough entraining agent is used to result in the separation of a high percentage of the azeotrope-forming hydrocarbon component, but not enough to result in residual fluorohalocarbon being present in the bottom product of the distillation. The amount of entraining agent used depends on the hydrocarbons being separated and the composition of the resulting azeotrope which is easily determined by experimentation. Generally, however, the amount of entrainer used is about 10 to about 50 mole percent of the azeotrope-forming hydrocarbon component.

The close-boiling components of the hydrocarbon mixture can be present in any ratio. However, the process of the invention is most valuable when applied to mixtures in which the azeotrope-forming hydrocarbon component is present in a relatively minor concentration. In such a case, a purified or enriched bottom product is obtained by fractionally distilling a relatively small quantity of azeotrope.

The temperature at which the azeotropic separations are carried out depends, of course, on the hydrocarbon feed material, the choice of entrainer and pressure of the distillation. The pressure of the distillation is preferably about one absolute atmosphere.

The fractional distillation columns which can be used in the practice of the present invention are the conventional fractionation columns which are well known in the art. Their selection as to size, number of plates, through-put, plate design, and the like, will be dictated by the degree of separation desired and the boiling points involved, using principles well known in the fractionation art.

Referring now to the drawing, the sole figure shows a typical azeotropic distillation using the process of the present invention. The hydrocarbon mixture to be separated is introduced through conduit 1 to fractionation zone 2. The overhead product from the fractionation zone is withdrawn through conduit 3. Entrainer is blended with the hydrocarbon mixture by introduction through conduit 4. The overhead product in conduit 3 contains an azeotrope of the entraining agent and one component of the hydrocarbon mixture. This overhead product is collected and subjected to a conventional separating technique such as phase separation which may be accomplished with the aid of chilling, a liquid-liquid extraction, fractionation, or the like, in zone 5. The entrainer which is recovered in zone 5 can be recycled to the initial fractionation zone. The bottom product from the fractionation zone 2, which will be either depleted in or completely separated from the component appearing in the overhead, is also subjected to a conventional separation in separation zone 6. From separation zone 6, the entrainer can be recycled back to the mixture of hydrocarbons in conduit 1. It is also within the scope of the invention process to recycle portions of the hydrocarbon product from the overhead or bottoms back to the fractionation zone 2 or to employ consecutive series of such fractionation in separation zones.

The fluorohalocarbons employed in the present invention are those which are available commercially or which can be prepared by techniques such as the electrochemical fluorination of suitable halocarbons for example.

The invention will be further illustrated by the following specific examples.

Example I

The invention was applied to the separation of n-pentane and pentene-2 (cis, trans mixture). The entrainer was 1,2-difluoro-1,2-dichloroethane. The hydrocarbon mixture and entrainer were charged into a kettle upon which was mounted an 8 mm. ID 1 foot long Hypercal fractionating column having about 10 separation stages at the operating conditions used. The reflux-take off ratio was 15/1. The charge proportions and the results of the distillation are shown in the following table. For purposes of comparison, an essentially similar distillation was carried out but without the presence of the fluorohalocarbon entrainer. The analysis is in mole percent.

TABLE 1

| With Agent Added | Charge | Bottoms | Distillate | | $\dfrac{\text{D Pentane}}{\text{B Pentane}}$ |
|---|---|---|---|---|---|
| n-Pentane | 18.0 | 35.4 | 31.7 | 46.8 | 52.5 | 1.65 |
| Pentene-2 | 34.3 | 64.6 | 68.3 | 42.4 | 47.5 | |
| 1,2-difluoro-1,2-dichloroethane | 47.7 | | | 10.8 | | |
| | 100.0 | 100.0 | 100.0 | 100.0 | 100.0 | |

| No Agent Added | Charge | Bottoms | Distillate | $\dfrac{\text{D Pentane}}{\text{B Pentane}}$ |
|---|---|---|---|---|
| n-Pentane | 41.2 | 40.1 | 45.7 | 1.14 |
| Pentene-2 | 58.8 | 59.9 | 54.3 | |
| | 100.0 | 100.0 | 100.0 | |

The observed head temperatures at 738 mm. Hg with and without the agent were 34 and 35° C.

Boiling points, ° C.:
    n-Pentene _____ 36.2
    Pentene-2 _____ [1] 36.7
    1,2-difluoro-1,2,dichloroethane _____ 59

[1] Mixed isomers.

The data in the table above show that the azeotrope formed with the addition of the 1,2-difluoro-1,2-dichloroethane is capable of substantially enriching the overhead of the azeotropic distillation in n-pentane, and, accordingly, enriching the bottoms product in pentene-2. The value of the entraining agent is seen by comparing the separation factors for the trials both with and without the entraining agent. Whereas the ratio of pentane in the distillate to the pentane in the bottoms without the entrainer was only 1.14, the ratio, when the entrainer was used, was increased to 1.65.

Example II

In this example, 1-fluoro-1,2-dichloroethane was used as an entrainer in the separation of 2,4-dimethylpentane and cyclohexane. Using the same column and with a procedure similar to that of Example I, the mixture of the above mentioned hydrocarbons was fractually distilled both with and without the use of the fluorohalocarbon entrainer. The results of these tests are shown in the following table:

TABLE 2

| With Agent Added | Charge | Bottoms | | Distillate | | D 2,4-dimethylpentane / B 2,4-dimethylpentane |
| --- | --- | --- | --- | --- | --- | --- |
| 2,4-dimethylpentane | 17.16 | 17.30 | 40.25 | 15.90 | 51.81 | 1.29 |
| Cyclohexane | 25.00 | 25.68 | 59.75 | 14.79 | 48.19 | |
| 1-fluoro-1,2-dichloroethane | 57.84 | 57.02 | ------ | 69.31 | ------ | |

| With No Agent | Charge | Bottoms | Distillate | D 2,4-dimethylpentane / B 2,4-dimethylpentane |
| --- | --- | --- | --- | --- |
| 2,4-dimethylpentane | | 40.7 | 39.52 | 43.59 | 1.10 |
| Cyclohexane | | 59.3 | 60.48 | 56.41 | |

Boiling points, °C.:
- 2,4-dimethylpentane _____ 80.5
- Cyclohexane _____ 80.7
- 1-fluoro-1,2-dichloroethane _____ [1]73

[1] (748 mm.).

The observed head temperatures at 748 mm. with and without the entrainer were 67 and 79.3° C. respectively.

The use of 1-fluoro-1,2-dichloroethane as an entrainer in the separation of cyclohexane from 2,4-dimethylpentane also shows advantage as shown by comparison of the runs both with and without the entrainer. The amount of 2,4-dimethylpentane in the distillate as compared to the 2,4-dimethylpentane in the bottoms for the run without the entrainer is a ratio of 1.10. The similar ratio from the run with the entrainer is 1.29. This shows a substantial enrichment of 2,4-dimethylpentane in the distillate which can be used to good advantage in the separation of these two materials.

Reasonable variation and modification are possible within the scope of the foregoing disclosure, the drawing, and the appended claims to the invention, the essence of which is that there has been provided a method for separating a mixture of close boiling hydrocarbons comprising subjecting the mixture to distillation conditions in the presence of an entrainer comprising fluoroholocarbons having 2 to 6 carbon atoms.

I claim:

1. The method of separating a mixture of close boiling hydrocarbons into one or more components comprising:
   (a) adding a fluorohalocarbon having at least one fluorine atom, at least one halogen atom other than fluorine and 2 to 6 carbon atoms per molecule to the mixture to form an admixture, said fluorohalocarbon functioning as an entrainer,
   (b) distilling the admixture thus formed whereby at least one of the components of the mixture is obtained in a relatively pure state.

2. The method of claim 1 wherein said entrainer has a boiling point within about 50° C. of that of the hydrocarbon mixture.

3. The method of claim 1 wherein the entrainer and one of the hydrocarbon components form a binary azeotrope, the amount of entrainer being added in the range of about 10 to 50 mole percent of the azeotrope forming hydrocarbon component.

4. The method of separating a mixture of close boiling hydrocarbons comprising subjecting the mixture to distillation conditions in the presence of an entrainer comprising fluorohalocarbons having 2 to 6 carbon atoms.

5. A method of claim 4 wherein the mixture of close boiling hydrocarbons comprises n-pentane and cis and trans isomers of pentene-2.

6. The method of claim 5 wherein the entrainer is 1,2-difluoro-1,2-dichloroethane.

7. The method of claim 4 wherein the mixture of close boiling hydrocarbons comprises 2,4-dimethylpentane and cyclohexane, and the entrainer is 1-fluoro-1,2-dichloroethane.

8. The mehod of claim 4 wherein the entrainer is 1,2-difluoro-1,2-dichloroethane.

9. The method of claim 4 wherein the entrainer is 1-fluoro-1,2-dichloroethane.

References Cited

UNITED STATES PATENTS

| | | | |
| --- | --- | --- | --- |
| 2,463,919 | 3/1949 | Stribley et al. | 203—67 |
| 2,692,227 | 10/1954 | Cines | 203—67 |
| 2,789,087 | 4/1957 | Cines | 203—67 |
| 3,147,198 | 9/1964 | Lindsay et al. | 203—67 |

NORMAN YUDKOFF, *Primary Examiner.*

W. BASCOMB, *Assistant Examiner.*